United States Patent
Mori et al.

(10) Patent No.: US 9,678,375 B2
(45) Date of Patent: Jun. 13, 2017

(54) DISPLAY DEVICE

(71) Applicant: Funai Electric Co., Ltd., Daito, Osaka (JP)

(72) Inventors: Yasuhiro Mori, Osaka (JP); Satoshi Ando, Osaka (JP); Yuki Kita, Osaka (JP); Kazuya Tanaka, Osaka (JP); Yuki Ogino, Osaka (JP); Nobuhiro Matsutani, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 363 days.

(21) Appl. No.: 14/140,205

(22) Filed: Dec. 24, 2013

(65) Prior Publication Data

US 2014/0192290 A1 Jul. 10, 2014

(30) Foreign Application Priority Data

Jan. 8, 2013 (JP) .................................. 2013-001394

(51) Int. Cl.
*G02F 1/1333* (2006.01)

(52) U.S. Cl.
CPC ................. *G02F 1/133308* (2013.01); *G02F 2001/133314* (2013.01); *G02F 2001/133317* (2013.01); *G02F 2201/46* (2013.01)

(58) Field of Classification Search
CPC ... G02F 1/133308; G02F 2001/133314; G02F 2001/133317; G02F 2201/46
USPC .......................................................... 349/58
See application file for complete search history.

(56) References Cited

U.S. PATENT DOCUMENTS

| | | | |
|---|---|---|---|
| 2005/0088839 A1* | 4/2005 | Huang | G02F 1/133604 362/633 |
| 2009/0122221 A1 | 5/2009 | Lee | |
| 2009/0296014 A1 | 12/2009 | Tseng et al. | |
| 2010/0073590 A1* | 3/2010 | Lee | G02B 6/0083 349/58 |
| 2010/0253874 A1* | 10/2010 | Ito | G02F 1/133308 349/58 |
| 2010/0302457 A1* | 12/2010 | Yamamoto | G02F 1/133308 348/725 |

(Continued)

FOREIGN PATENT DOCUMENTS

| | | |
|---|---|---|
| EP | 2083313 A1 | 7/2009 |
| EP | 2172802 A1 | 4/2010 |

(Continued)

OTHER PUBLICATIONS

Extended European Search Report of the corresponding European Application No. 14150305.2, dated Apr. 24, 2014.

*Primary Examiner* — James Dudek
(74) *Attorney, Agent, or Firm* — Global IP Counselors, LLP

(57) ABSTRACT

A display device includes a display component, a plastic frame, and a rear frame. The plastic frame supports the display component near an edge portion of the display component from a rear side of the display device relative to the display component. The rear frame is disposed on the rear side of the display device relative to the display component. The rear frame includes a fixing component that fixedly couples at least the plastic frame relative to the rear frame. The fixing component has an inner bent component that extends forward and inward of the display device from an edge part of the rear frame.

18 Claims, 10 Drawing Sheets

(56) References Cited

U.S. PATENT DOCUMENTS

2011/0149193 A1* 6/2011 Ando ................ G02F 1/133308
349/58
2013/0077015 A1* 3/2013 Wang ................ G02F 1/133308
349/58

FOREIGN PATENT DOCUMENTS

| JP | 2007-120250 A | 5/2007 |
|----|---------------|--------|
| JP | 2009-176544 A | 8/2009 |
| JP | 2011-108577 A | 6/2011 |
| JP | 2011-133545 A | 7/2011 |
| JP | 5054778 B | 10/2012 |

* cited by examiner

DISPLAY DEVICE

CROSS-REFERENCE TO RELATED APPLICATIONS

This application claims priority to Japanese Patent Application No. 2013-001394 filed on Jan. 8, 2013. The entire disclosure of Japanese Patent Application No. 2013-001394 is hereby incorporated herein by reference.

BACKGROUND

Field of the Invention

The present invention generally relates to a display device. More specifically, the present invention relates to a display device with a rear frame.

Background Information

Display devices equipped with a rear frame are conventionally known (see Japanese Laid-Open Patent Application Publication No. 2011-133545 (Patent Literature 1), for example).

The above-mentioned Patent Literature 1 discloses a liquid crystal module having a liquid crystal panel (e.g., a display component) and a lamp frame that is disposed near the edge of the liquid crystal panel and supports the liquid crystal panel. This liquid crystal module includes a sheet metal rear frame that is disposed on the rear face side of the liquid crystal panel. The rear frame includes a substantially U-shaped flange formed by bending the edge outward. The flange is configured so as to be used as a fixing component that fixes the lamp frame. The liquid crystal module is configured to be fixed to a front cabinet of a liquid crystal television set (e.g., a display device) or the like by the flange. With this liquid crystal module, because the flange is provided to the rear frame, there is no need for a fixing member for fixing the lamp frame, which supports the liquid crystal panel, to the rear frame, and the lamp frame can be fixed directly to the rear frame. Consequently, the number of parts required can be reduced since there is no need to provide a dedicated fixing member.

SUMMARY

With the liquid crystal module in Patent Literature 1, although the number of parts can be reduced by providing a flange to the rear frame as discussed above, the flange is formed by bending the edge of the rear frame outward such that it is substantially U-shaped. When the liquid crystal module in Patent Literature 1 is applied to a display device, it is conceivable that the rear frame of the liquid crystal module will also be used (will double) as the rear housing of the display device. However, it has been discovered that with the rear frame of the liquid crystal module in Patent Literature 1, because the edge of the rear frame is bent outward into an approximate U shape as mentioned above, the flange is exposed on the outside, which is not well suited to a rear housing.

One object of the present disclosure is to provide a display device with which fewer parts are required, and in which a rear frame can be favorably used as a rear housing.

In view of the state of the know technology, a display device includes a display component, a plastic frame, and a rear frame. The plastic frame supports the display component near an edge portion of the display component from a rear side of the display device relative to the display component. The rear frame is disposed on the rear side of the display device relative to the display component. The rear frame includes a fixing component that fixedly couples at least the plastic frame relative to the rear frame. The fixing component has an inner bent component that extends forward and inward of the display device from an edge part of the rear frame.

Other objects, features, aspects and advantages of the present disclosure will become apparent to those skilled in the art from the following detailed description, which, taken in conjunction with the annexed drawings, discloses a preferred embodiment of a display device.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Referring to FIGS. 1 to 14, a TV 100 (e.g., a television set) is illustrated in accordance with one embodiment. The TV 100 is an example of the "display device" of the present invention.

Figure 1:
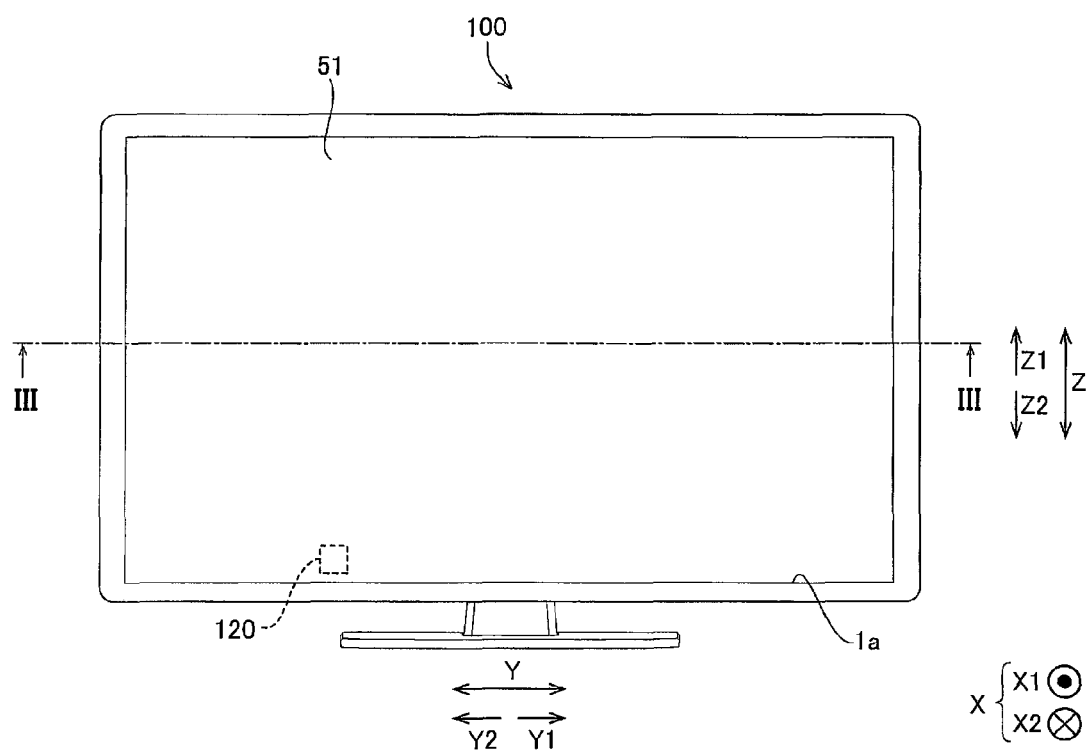
FIG. 1 is a front elevational view of a TV in accordance with one embodiment.
Figure 2:
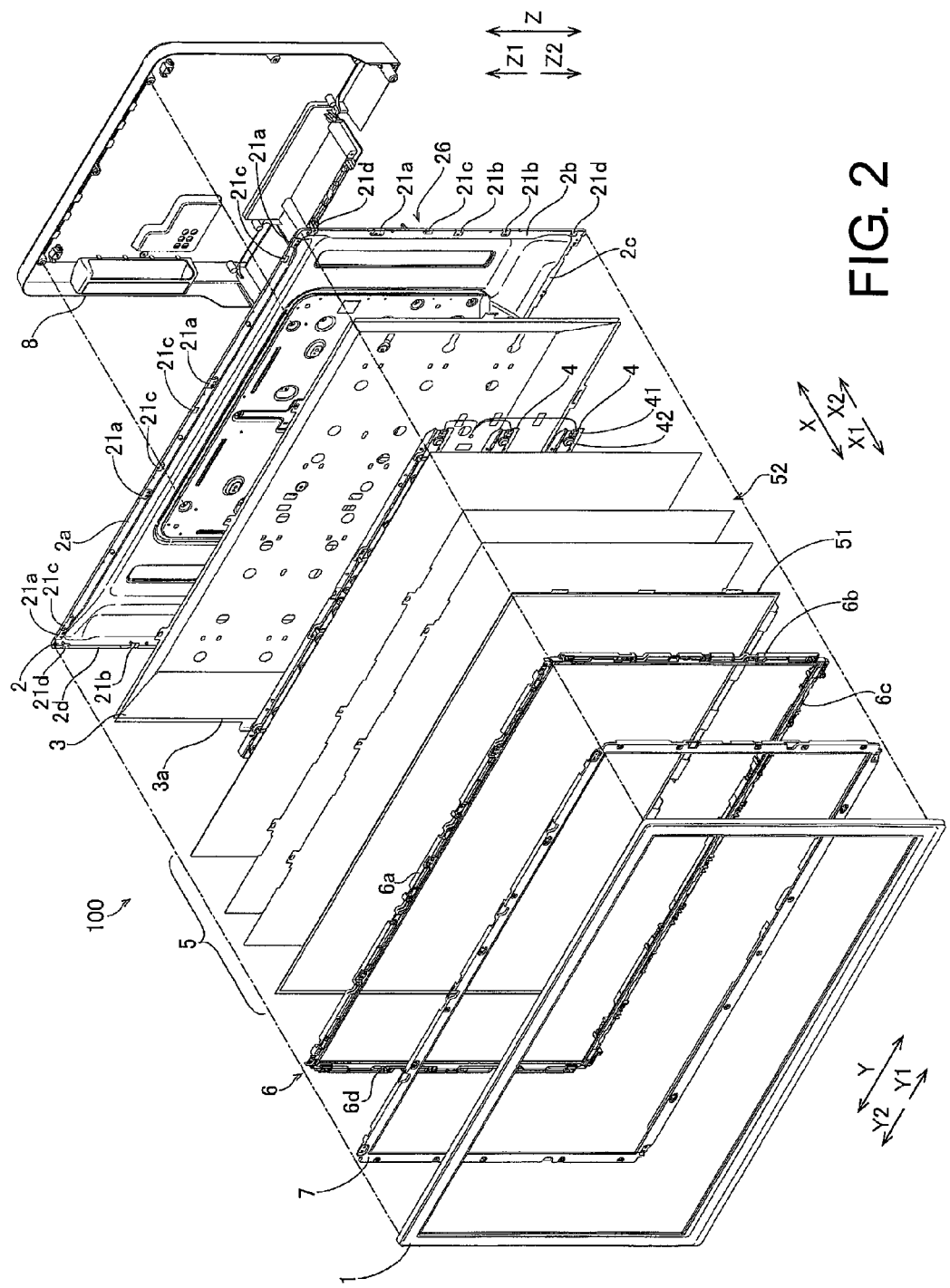
FIG. 2 is an exploded perspective view of the TV illustrated in FIG. 1.

As shown in FIGS. 1 and 2, the TV 100 includes a rectangular front frame 1 (see FIG. 1) with an opening 1a, and a rear frame 2. The front frame 1 is configured to cover the front face side or front side (the X1 direction side or forward of the display device) of the TV 100. The TV 100 also includes a liquid crystal cell or liquid crystal panel 51 (discussed below) that is exposed from the opening 1a of the front frame 1. The front frame 1 is molded from plastic. The rear frame 2 is configured to cover the rear face side or rear side (the X2 direction side or rearward of the display device) of the TV 100. The TV 100 has a tuner 120 that is configured to receive broadcast signals.

Figure 3:
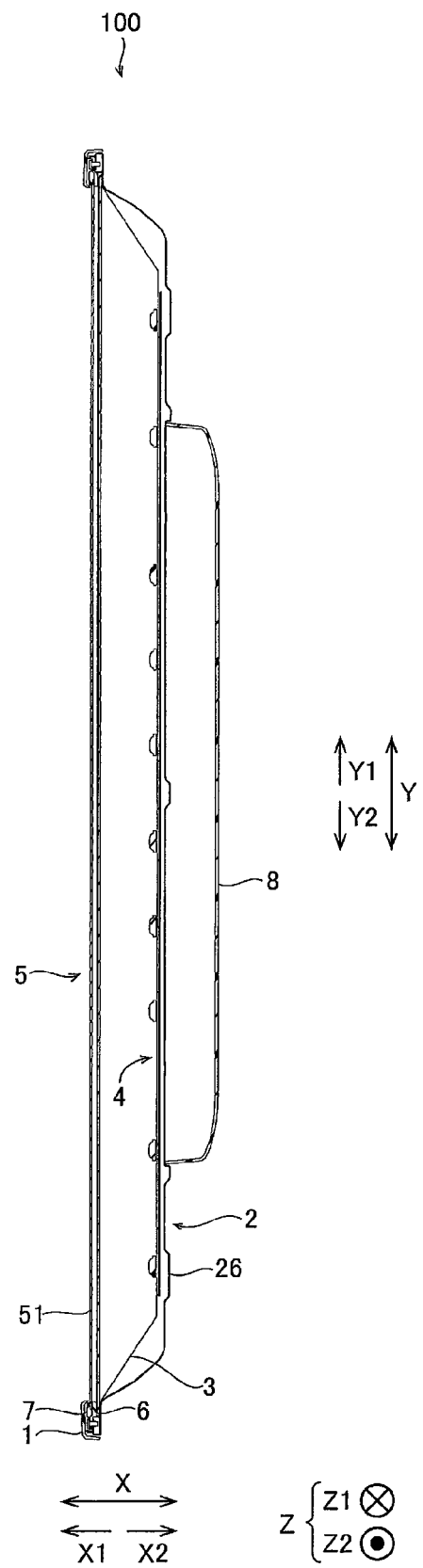
FIG. 3 is a cross sectional view of the TV taken along line in FIG. 1.

As shown in FIGS. 2 and 3, the TV 100 also includes a reflective sheet 3, an LED module 4, an optical member 5, a plastic frame 6, a bezel 7, and a cover 8. The reflective sheet 3, the LED module 4, the optical member 5, the plastic frame 6 and the bezel 7 are disposed inside the TV 100. The cover 8 is disposed on the rear face side (the X2 direction side) of the rear frame 2, and covers the substrate (not shown) disposed on the rear face side of the rear frame 2 and so forth. The TV 100 is a direct backlight type of television set in which the LED module 4 is disposed on the rear face side of the optical member 5. As shown in FIG. 2, the optical member 5 has the liquid crystal cell 51, and various kinds of optical sheets 52, etc. The liquid crystal cell 51 is an example of the "display component" of the present invention.

As shown in FIG. 2, in the illustrated embodiment, the rear frame 2 is disposed on the rear face side (the X2 direction side) of the liquid crystal cell 51. The rear frame 2 is formed from SECC (steel electrically chromate coated, or steel, electrogalvanized, cold-rolled, coil) sheet metal or the like. The rear frame 2 includes a rear housing component 26 that makes up part of the rear housing (rear cabinet) of the TV 100. In other words, the rear frame 2 forms at least a part of the rear housing of the TV 100. More specifically, as shown in FIGS. 2 and 3, the plastic cover 8 is disposed to expose the outer edge of the rear frame 2 other than the part near the center on the X2 direction side, and the portion around this outer edge. With this configuration, the rear housing component 26 is exposed. Also, the rear frame 2 is configured such that the rear frame 2 is covered by the cover 8 only near the center on the X2 direction side. This allows the rear frame 2 to be used as part of the rear housing of the TV 100. Thus, the rear housing of the TV 100 is formed by the cover 8 and the rear housing component 26 of the rear frame 2. The cover 8 and the rear housing component 26 are examples of the "rear housing" of the present invention.

Figure 4:
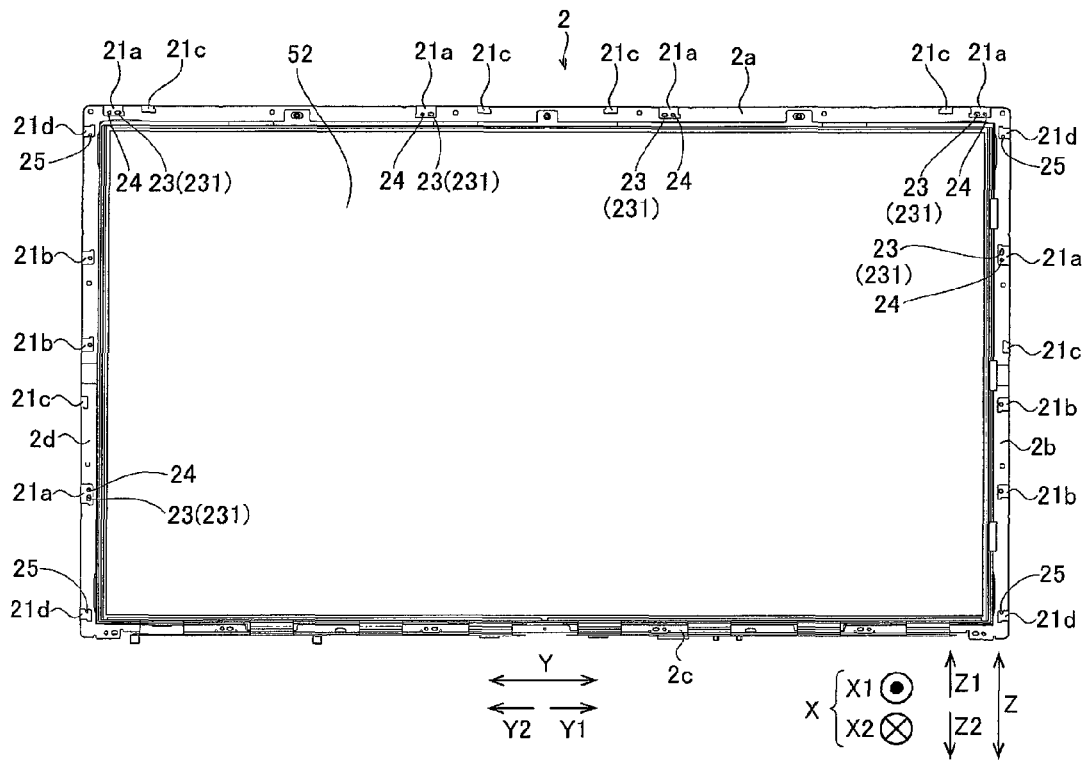
FIG. 4 is a front elevational view of a rear frame of the TV illustrated in FIG. 1.

As shown in FIGS. 2 and 4, the rear frame 2 includes a plurality of first bent components 21a that is formed by bending the Y2 direction edges 2a, 2b, and 2d toward the inside (the center side of the liquid crystal cell 51) on the front side (the X1 direction side). In other words, the first bent components 21a extend forward and inward of the TV 100 from the edges 2a, 2b, and 2d (e.g., edge parts) of the rear frame 2. Also, each of the first bent components 21a is substantially rectangular in plan view (see FIG. 4). Each of the first bent components 21a is formed at a position that does not expose the portion of the rear frame 2 forming the rear housing (the rear housing component 26) (see FIG. 3). In other words, the first bent components 21a is disposed inside of the display device defined between the rear housing and the front frame 1 such that the first bent components 21a are not exposed rearward of the TV 100. The first bent components 21a are examples of the "inner bent component" of the present invention.

Figure 7:
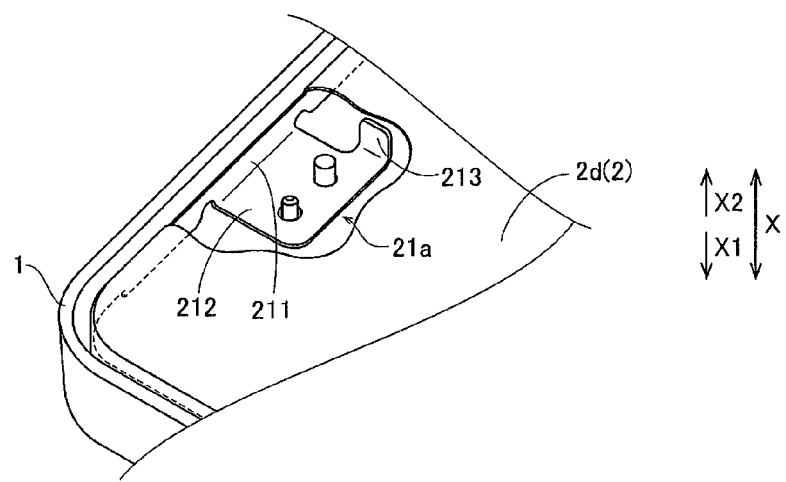
FIG. 7 is an enlarged, partial perspective view of a first bent component of the TV illustrated in FIG. 1.
Figure 9:
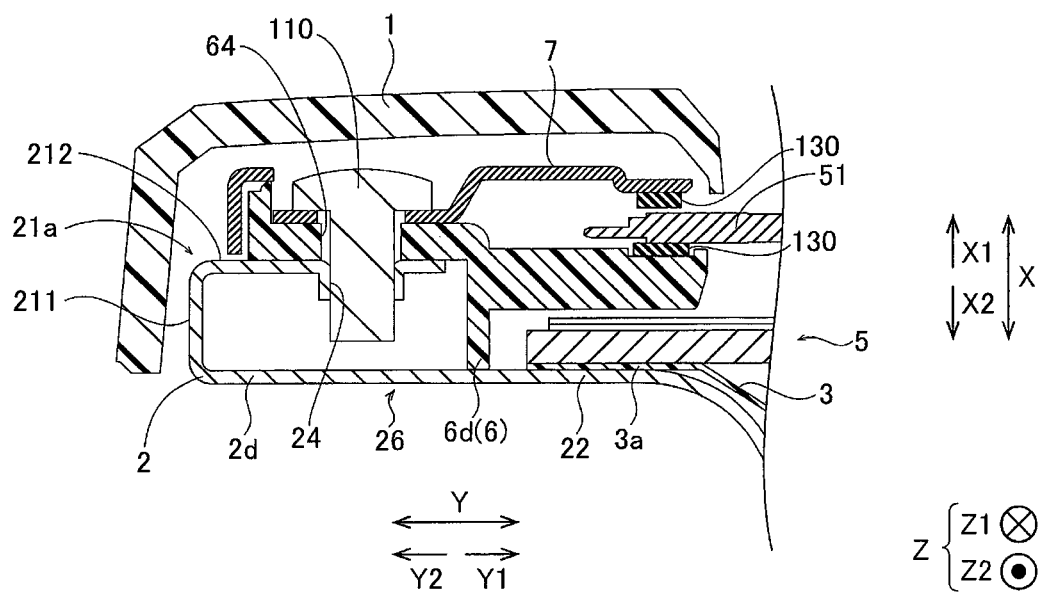
FIG. 9 is a partial cross sectional view of the TV illustrated in FIG. 1, illustrating a state in which the plastic frame has been fastened with screws in the TV.
Figure 10:
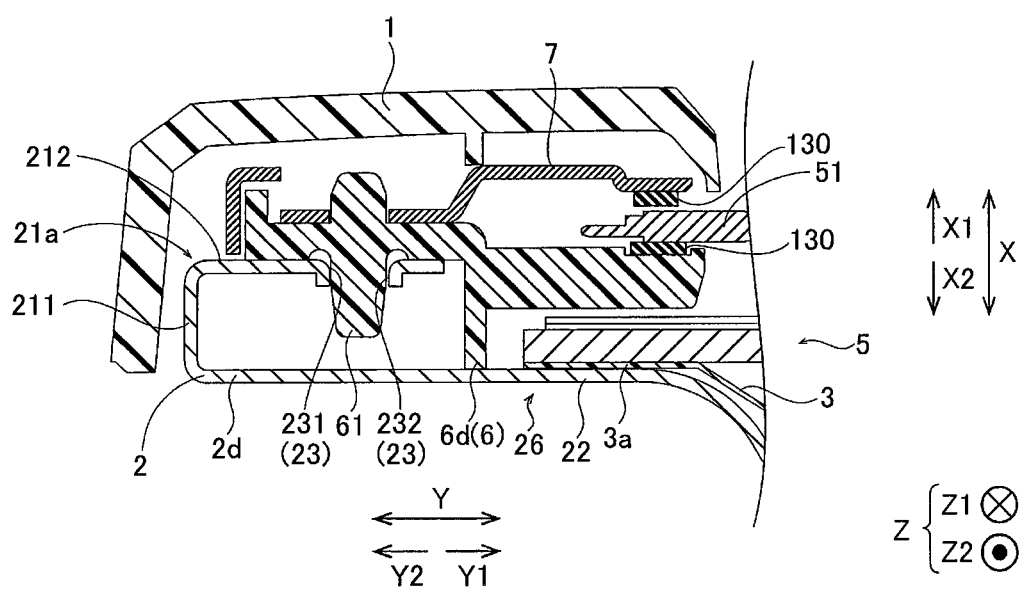
FIG. 10 is a partial cross sectional view of the TV illustrated in FIG. 1, illustrating a state in which the plastic frame of the TV has been positioned.

As shown in FIGS. 7, 9, and 10, each of the first bent components 21a is substantially L-shaped member having a side part 211 extending in the longitudinal direction (X direction or forward of the display device), and a front part 212 extending substantially perpendicular to the longitudinal direction. The first bent components 21a is formed by bending such that the side part 211 and the edge 2d intersect at an angle of approximately 90 degrees. Just as with the edge 2d, each of the first bent components 21a is formed by bending such that the side part 211 and the edges 2a and 2b intersect at an angle of approximately 90 degrees. Thus, the side parts 211 of the first bent components 21a extends forward from the edges 2a, 2b and 2d, while the front parts 212 extend substantially perpendicular to the side parts 211 from front edges of the side parts 211, respectively. The plastic frame 6 is fixedly coupled to the front parts 212 of the first bent components 21a. In particular, the plastic frame 6 is fixedly coupled to the first bent components 21a by screws 110. Each of the first bent components 21a is also formed by bending such that the side part 211 and the front part 212 intersect at an angle of approximately 90 degrees.

Figure 11:
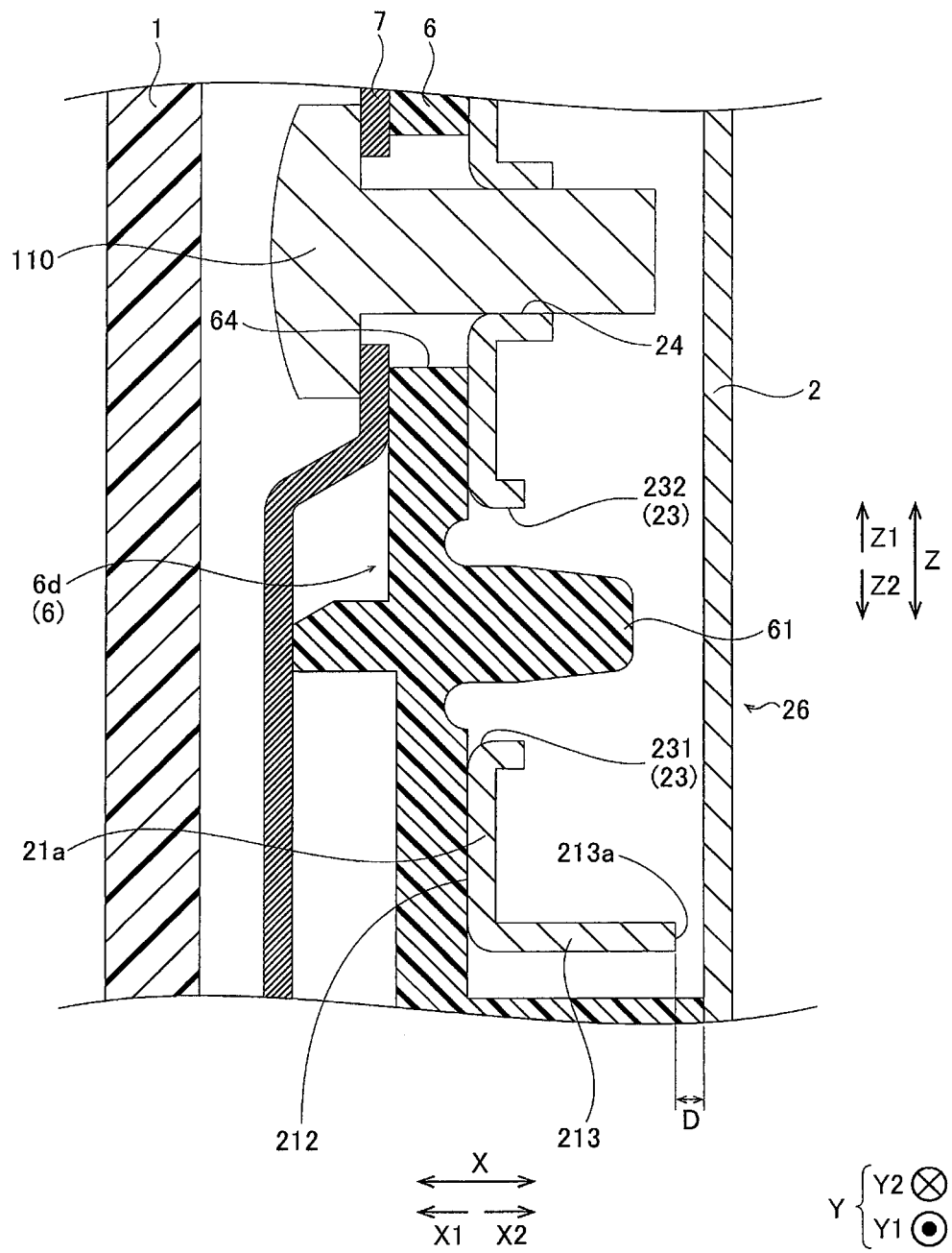
FIG. 11 is a partial cross sectional view of the TV illustrated in FIG. 1, illustrating an anti-deformation component of the TV.

As shown in FIGS. 7 and 11, each of the first bent components 21a includes an anti-deformation component 213 that is formed to protrude from the front face side toward the rear face side (from the X1 direction side to the X2 direction side). In other words, the anti-deformation components 213 protrude rearward of the TV 100 from the front parts 212 of the first bent components 21a, respectively. The anti-deformation component 213 has the function of maintaining the spacing between the edge 2a, 2b, or 2d and the front part 212 of the rear frame 2. The anti-deformation component 213 is formed by bending such that it intersects the front part 212 at an angle of approximately 90 degrees. Each of the first bent components 21a is configured such that the distal end 213a of the anti-deformation component 213 is a specific spacing D (see FIG. 11) away from the edge 2a, 2b, or 2d of the rear frame 2.

As shown in FIGS. 9 and 11, each of the first bent components 21a is configured to be used as a fixing component that positions the plastic frame 6 and fixedly couples the plastic frame 6 with screws 110 relative to the rear frame 2. As shown in FIG. 4, one first bent component 21a is formed at the Y1 direction edge 2b and one at the Y2 direction edge 2d of the rear frame 2. A plurality of the first bent components 21a is formed on the edge 2a on the Z1 direction side of the rear frame 2. The screws 110 are an example of the "fastening member" of the present invention.

Figure 5:
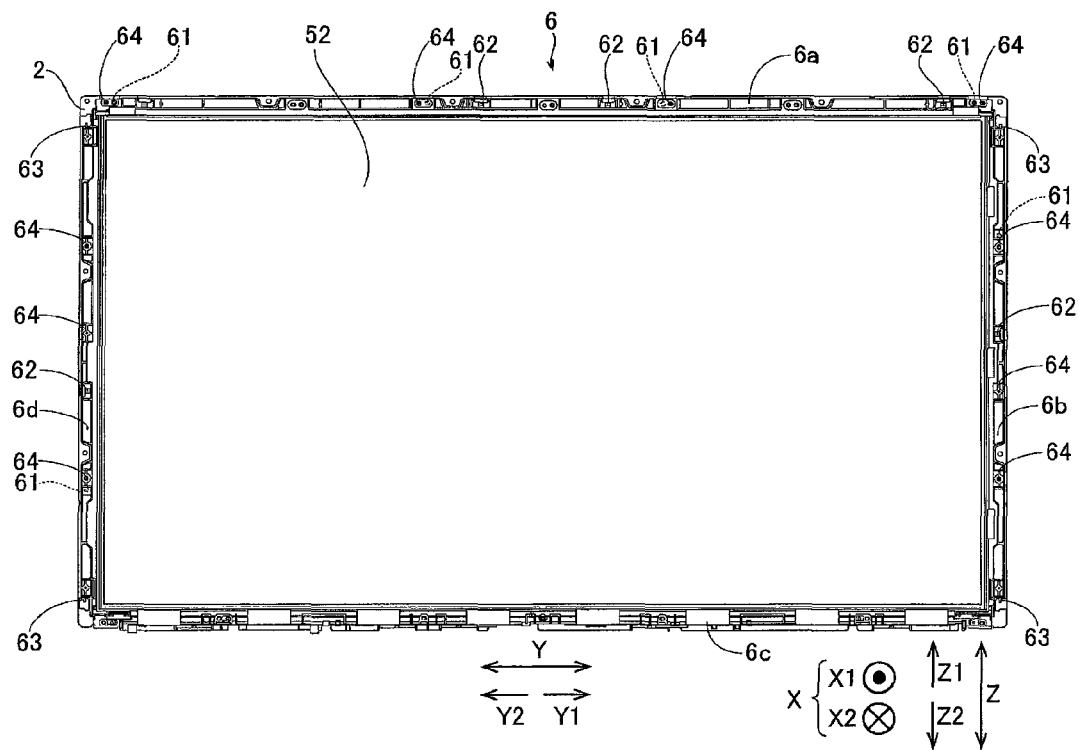
FIG. 5 is a front elevational view of a plastic frame installed in the rear frame of the TV illustrated in FIG. 1.
Figure 6:
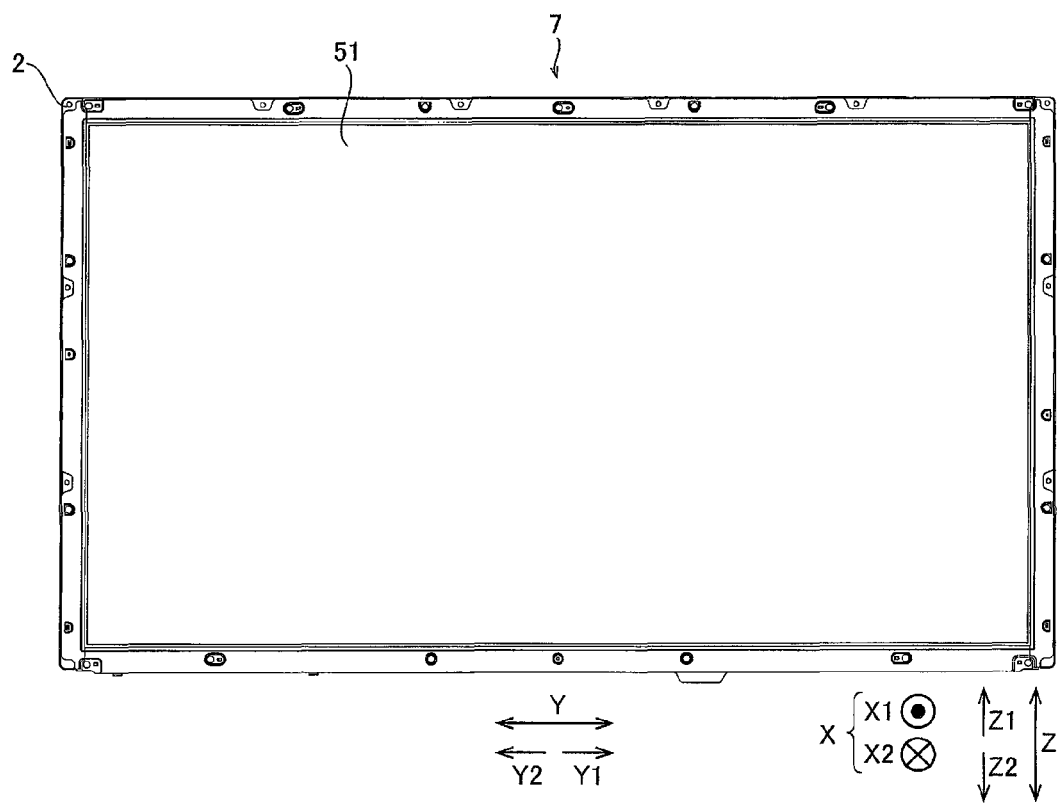
FIG. 6 is a front elevational view of a bezel installed on the rear frame of the TV illustrated in FIG. 1.

As shown in FIG. 4, the first bent components 21a include rear frame-side positioning components 23 formed at positions corresponding to plastic frame-side positioning components 61 of the plastic frame 6 (see FIG. 5). More precisely, as shown in FIGS. 10 and 11, the rear frame-side positioning components 23 each include a hole 231 into which the plastic frame-side positioning components 61 of the plastic frame 6 are inserted, and a guide component 232 (e.g., a burring part) that is formed by burring in the direction in which the plastic frame-side positioning components 61 are inserted into the holes 231 (the X2 direction). In other words, the rear frame-side positioning components 23 each include the guide component 232 (e.g., the burring part) with the hole 231 in which corresponding one of the plastic frame-side positioning components 61 of the plastic frame 6 is disposed. The guide components 232 axially extend rearward of the TV 100, respectively. As shown in FIGS. 9 and 11, each of the first bent components 21a include a hole 24 into which is inserted the screw 110 for fixing the plastic frame 6. The rear frame-side positioning components 23 are an example of the "second positioning component" of the present invention.

The second bent components 21b are configured to be used as a fixing component for fixing the plastic frame 6 with the screws 110. As shown in FIG. 4, the plurality of the second bent components 21b are formed on the Y1 direction edge 2b and the Y2 direction edge 2d of the rear frame 2. The second bent components 21b have the same function as the first bent components 21a (the function of fixing the plastic frame 6 with the screws 110), except that it has no portion for positioning the plastic frame 6. The second bent components 21b are examples of the "inner bent component" of the present invention.

As shown in FIGS. 2 and 4, the second bent components 21b are similar to the first bent components 21a in that they are formed by bending the Y2 direction edges 2a, 2b, and 2d toward the inside (the center side of the liquid crystal cell 51) on the front side (the X1 direction side). Also, the second bent components 21b are substantially rectangular in plan view (see FIG. 4), just as are the first bent components 21a. The second bent components 21b are similar to the first bent components 21a in that they are formed at a position that is not exposed from the rear frame 2 as seen from the rear face side (the X2 direction side). The second bent components 21b are also similar to the first bent components 21a in that they are substantially L-shaped, and are bent at approximately 90 degrees such that the second bent components 21b each include the side part 211 extending in the longitudinal direction (X direction), and the front part 212 extending substantially perpendicular to the longitudinal direction. The second bent components 21b are also similar to the first bent components 21a in that they include the anti-deformation component 213 that is formed to protrude from the front face side toward the rear face side (from the X1 direction side to the X2 direction side).

Figure 12:
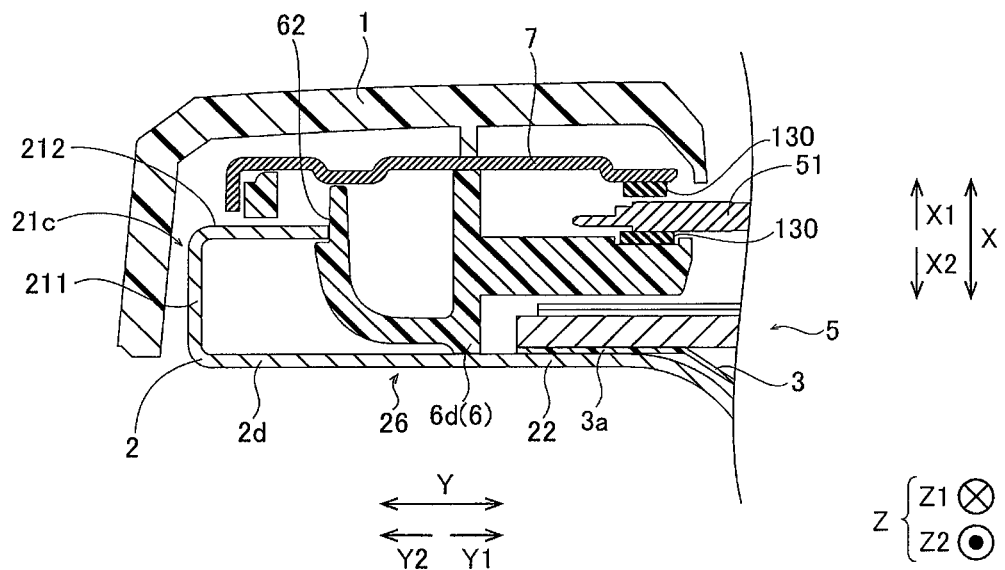
FIG. 12 is an enlarged, partial perspective view of the TV illustrated in FIG. 1, illustrating a state in which the plastic frame of the TV has been tacked.

As shown in FIG. 12, a plurality of tacking support components 21c is configured to tack or temporarily fix the plastic frame 6. As shown in FIG. 4, one tacking support component 21c is formed on the Y1 direction edge 2b and one on the Y2 direction edge 2d of the rear frame 2. A plurality of the tacking support components 21c is formed on the Z1 direction edge 2a of the rear frame 2. Also, the tacking support components 21c are formed at positions corresponding to plastic frame-side tacking support components 62 of the plastic frame 6 (see FIG. 5). The tacking support components 21c are formed near or adjacent to the rear frame-side positioning components 23 (or the first bent components 21a). The tacking support components 21c are examples of the "second tacking component" of the present invention.

As shown in FIGS. 2 and 4, the tacking support components 21c are similar to the first bent components 21a in that they are formed by bending the Y2 direction edges 2a, 2b, and 2d toward the inside (the center side of the liquid crystal cell 51) on the front side (the X1 direction side). Also, the tacking support components 21c are substantially rectangular in plan view (see FIG. 4), just as are the first bent components 21a. The tacking support components 21c are similar to the first bent components 21a in that they are formed at a position that is not exposed from the rear frame 2 as seen from the rear face side (the X2 direction side). Also, as shown in FIG. 12, the tacking support components 21c are similar to the first bent components 21a in that they are substantially L-shaped, and are bent at approximately 90 degrees such that the tacking support components each include the side part 211 extending in the longitudinal direction (X direction), and the front part 212 extending substantially perpendicular to the longitudinal direction. The tacking support components 21c are also similar to the first bent components 21a in that they include the anti-deformation component 213 that is formed to protrude from the front face side toward the rear face side (from the X1 direction side to the X2 direction side).

Figure 8:
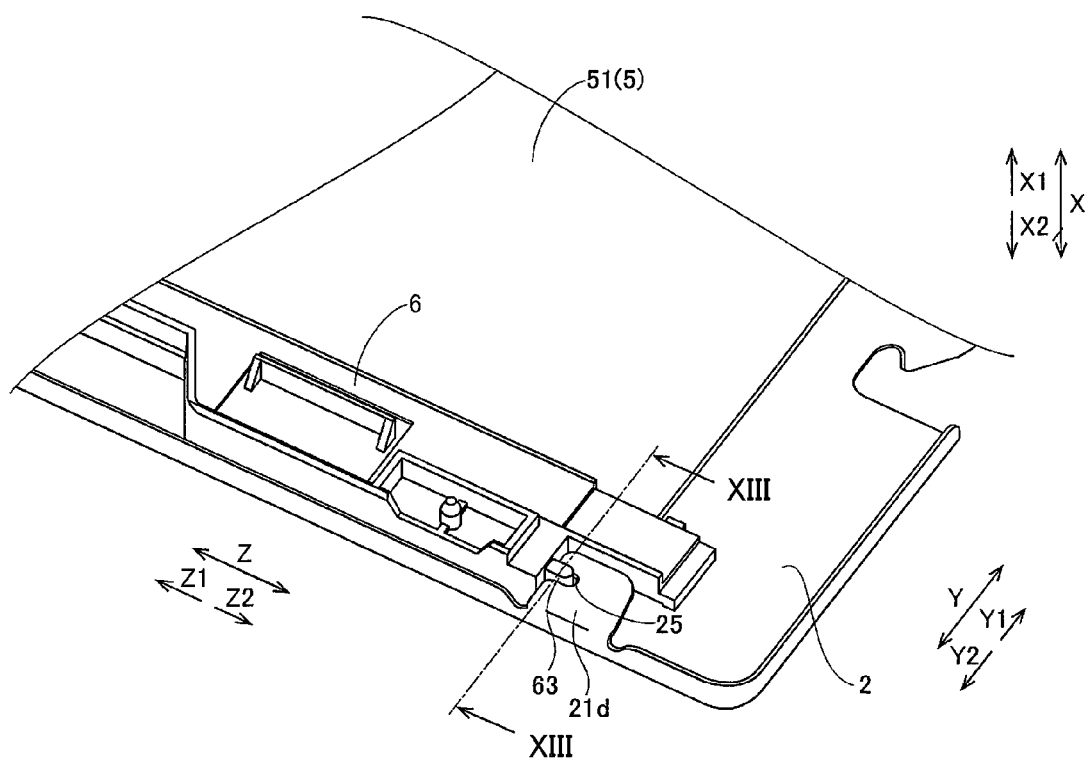
FIG. 8 is an enlarged, partial perspective view of the plastic frame fixed to the rear frame of the TV illustrated in FIG. 1.
Figure 13:
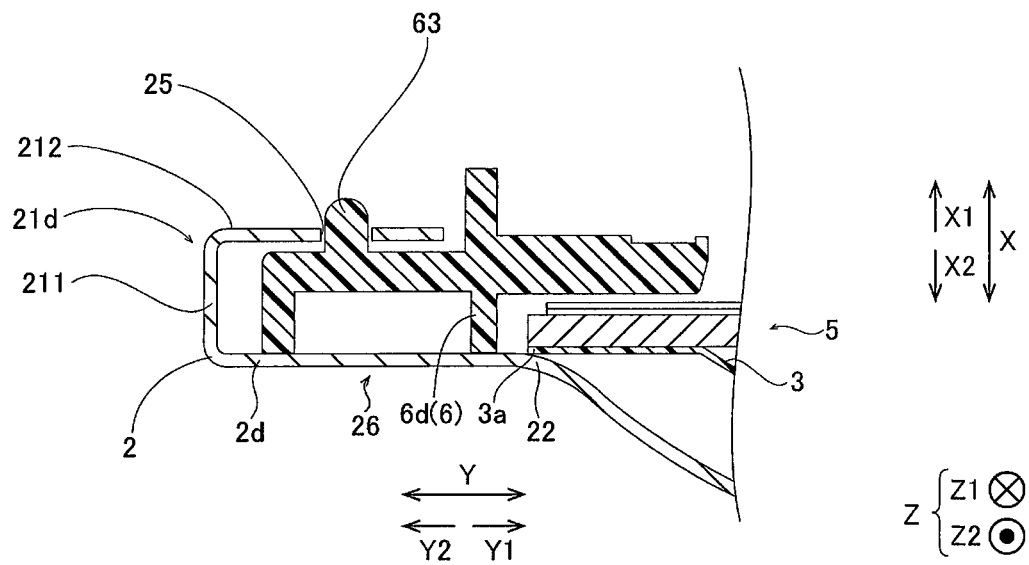
FIG. 13 is a partial cross sectional view of the TV taken along XIII-XIII line in FIG. 8.

As shown in FIGS. 8 and 13, a plurality of anti-shifting components 21d is configured to prevent shifting of the plastic frame 6 tacked to the rear frame 2. More specifically, notches 25 that engage with plastic frame-side anti-shifting components 63 of the plastic frame 6 are formed on the inside in the Z direction. As shown in FIG. 4, the anti-shifting components 21d are formed as pairs on the Y1 direction edge 2b and the Y2 direction edge 2d of the rear frame 2. A pair of anti-shifting components 21d is formed near both ends of the edges 2b and 2b in the Z direction. The anti-shifting components 21d are formed at positions corresponding to the plastic frame-side anti-shifting components 63 of the plastic frame 6 (see FIG. 5). The notches 25 are examples of the "second engagement component" of the present invention.

Also, as shown in FIGS. 2 and 4, the anti-shifting components 21d are similar to the first bent components 21a in that they are formed by bending the Y2 direction edges 2a, 2b, and 2d toward the inside (the center side of the liquid crystal cell 51) on the front side (the X1 direction side). The anti-shifting components 21d are substantially rectangular in plan view (see FIG. 4), just as are the first bent components 21a. The anti-shifting components 21d are also similar to the first bent components 21a in that they are formed at a position that is not exposed from the rear frame 2 as seen from the rear face side (the X2 direction side). As shown in FIG. 13, the anti-shifting components 21d are also similar to the first bent components 21a in that they are substantially L-shaped, and are bent at approximately 90 degrees such that the anti-shifting components 21d each include the side part 211 extending in the longitudinal direction (X direction), and the front part 212 extending substantially perpendicular to the longitudinal direction. The anti-shifting components 21d are also similar to the first bent components 21a in that they include the anti-deformation component 213 that is formed to protrude from the front face side toward the rear face side (from the X1 direction side to the X2 direction side).

As shown in FIG. 3, the rear frame 2 is formed in a concave shape that is recessed toward the rear face side (the X2 direction side). As shown in FIGS. 9, 10, 12, and 13, the portions on the inside (the center side of the liquid crystal cell 51) of the first bent components 21a, the second bent components 21b, the tacking support components 21c, and the anti-shifting components 21d of the rear frame 2 include support components 22 for supporting the reflective sheet 3. The support components 22 are formed on the edges 2a to 2d of the rear frame 2. The support components 22 are also formed to be substantially parallel to the optical member 5 (the liquid crystal cell 51). The support components 22 are configured to support the area near the edges 3a of the reflective sheet 3. In other words, the rear frame 2 has a concave center part that is recessed rearward of the TV 100, and the support components 22 (e.g., sheet support parts) that support the reflective sheet 3, respectively. The support components 22 are disposed inward of the TV 100 relative to the first bent components 21a (e.g., the inner bent components) adjacent to the edges 2a to 2d (e.g., the edge parts) of the rear frame 2.

As shown in FIG. 2, the reflective sheet 3 is disposed on the front face side (X1 direction side) of the rear frame 2. The reflective sheet 3 has the function of reflecting light emitted from a plurality of LEDs 42 toward the front face side. As shown in FIG. 3, the reflective sheet 3 is formed in a concave shape corresponding to the shape of the rear frame 2. The LEDs 42 are examples of the "light source" of the present invention. In other words, the TV includes the LEDs 42 (e.g., the light sources) configured to emit light, and the reflective sheet 3 configured to reflect the light emitted from the light source forward of the TV 100.

As shown in FIG. 2, three of the LED modules 4 are disposed on the front face side (the X1 direction side) of the reflective sheet 3. The LED modules 4 each include a LED substrate 41 and a plurality of the LEDs 42 disposed on the LED substrate 41.

As shown in FIGS. 9, 10, 12, and 13, the optical member 5 is configured such that the liquid crystal cell 51 is disposed on the front face side (the X1 direction side) of the various optical sheets 52. The front face side (the X1 direction side) and the rear face side (X2 direction side) of the liquid crystal cell 51 are configured to be sandwiched between the bezel 7 and the plastic frame 6 via a cushioning member 130.

In the illustrated embodiment, as shown in FIGS. 9, 10, and 12, the plastic frame 6 is disposed near the edges (e.g., edge portions) of the liquid crystal cell 51, and is configured to support the liquid crystal cell 51 from the rear face side (the X2 direction side). The plastic frame 6 includes threaded holes 64 (see FIG. 5) into which the screws 110 are inserted for fixing the plastic frame 6 to the rear frame 2. As shown in FIGS. 2 and 5, the plastic frame 6 has an upper plastic frame 6a, a right plastic frame 6b, a lower plastic frame 6c, and a left plastic frame 6d. The upper plastic frame 6a, the right plastic frame 6b, and the left plastic frame 6d are configured to be fixed to the rear frame 2 by being fixed to the front part 212 of the first bent components 21a and the second bent components 21b. The lower plastic frame 6c is configured to be fixed directly to the rear frame 2, without the first bent components 21a or the second bent components 21b being interposed.

More precisely, as shown in FIGS. 9 and 11, the left plastic frame 6d is configured to be fixed to the first bent component 21a by the screw 110. The left plastic frame 6d configured to be fixed to the second bent components 21b by the screws 110, just as with the first bent component 21a. As shown in FIG. 5, the left plastic frame 6d includes the plastic frame-side positioning component 61 at the position corresponding to the rear frame-side positioning component 23 of the rear frame 2 (see FIG. 4). As shown in FIGS. 10 and 11, the plastic frame-side positioning component 61 is formed in the shape of a tapered boss (e.g., a tapered boss part) extending toward the rear face side (the X2 direction side) or rearward of the TV 100. Just as with the left plastic frame 6d, the upper plastic frame 6a and the right plastic frame 6b include the plastic frame-side positioning components 61 at positions corresponding to the rear frame-side positioning components 23 of the rear frame 2. Just as with the left plastic frame 6d, the plastic frame-side positioning components 61 of the upper plastic frame 6a and the right plastic frame 6b are formed in the shape of a tapered boss extending toward the rear face side. The plastic frame-side positioning components 61 are examples of the "first positioning component" of the present invention.

As shown in FIG. 5, the left plastic frame 6d includes the plastic frame-side tacking support component 62, which is formed near or adjacent to the plastic frame-side positioning components 61. More specifically, the plastic frame-side tacking support component 62 has a hook shape (see FIG. 12) extending in the X1 direction. The plastic frame-side tacking support component 62 is engaged with the front part 212 of the tacking support components 21c by the snap-fit or hook. Just as with the left plastic frame 6d, the upper plastic frame 6a and the right plastic frame 6b include the plastic frame-side tacking support components 62, which are formed near or adjacent to the plastic frame-side positioning components 61. The plastic frame 6 is formed to extend along one side of the liquid crystal cell 51, and includes a pair of plastic frame-side anti-shifting components 63 at both ends in the lengthwise direction (the Z direction). As shown in FIGS. 8 and 13, the plastic frame-side anti-shifting components 63 are formed to engage with the notches 25 in the anti-shifting components 21d. The plastic frame-side tacking support components 62 are examples of the "first tacking component" of the present invention. The plastic frame-side anti-shifting components 63 are examples of the "first engagement component" of the present invention. In other words, the plastic frame 6 includes a pair of the plastic frame-side anti-shifting components 63 (e.g., the first engagement components) at both ends of a side portion (e.g., a left plastic frame 6b or a right plastic frame 6d) of the plastic frame 6, respectively. The rear frame 2 includes a pair of the notches 25 of the anti-shifting components 21d (e.g., the second engagement components) at positions corresponding to the plastic frame-side anti-shifting components 63 (e.g., the first engagement components) of the plastic frame 6. The plastic frame-side anti-shifting components 63 and the notches 25 of the anti-shifting components 21d are engaged with respect to each other, respectively.

As shown in FIGS. 2, 6, and 9 to 13, the bezel 7 is disposed on the front face side (the X1 direction side) of the plastic frame 6. The bezel 7 is formed in a rectangular shape (see FIG. 5) corresponding to the plastic frame 6. The bezel 7 is formed from SECC.

Next, a method for manufacturing the rear frame 2 will be described through reference to FIGS. 9 to 14.

First, sheet metal is formed into a shape corresponding to the rear frame 2. The sheet metal formed into a shape corresponding to the rear frame 2 here will have a substantially flat shape. Next, the holes 231 into which the plastic frame-side positioning components 61 of the plastic frame 6 are inserted, and the guide components 232 formed in the direction in which the plastic frame-side positioning components 61 are inserted into the holes 231 are formed at specific positions by burring.

Figure 14:
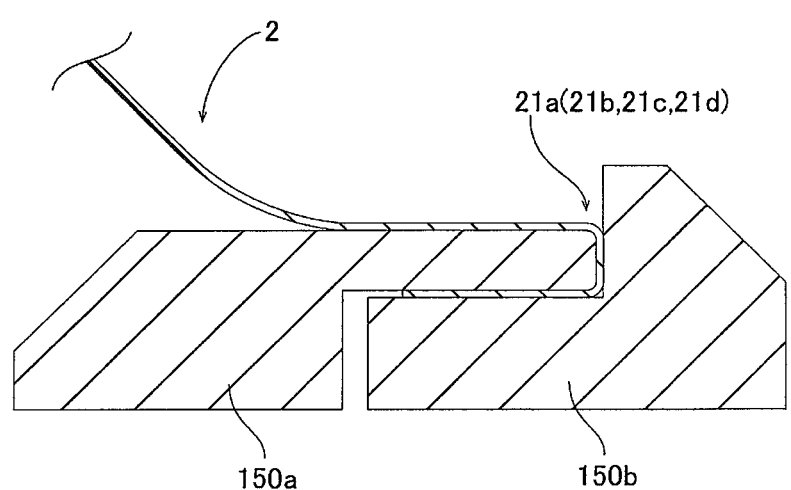
FIG. 14 is a cross sectional view of the rear frame of the TV illustrated in FIG. 1, illustrating a state in which the rear frame of the TV is formed.

As shown in FIG. 14, the first bent components 21a, the second bent components 21b, the tacking support components 21c, and the anti-shifting components 21d are formed by cam molding using metal molds 150a and 150b that sandwich the sheet metal from the left and right sides. This forms the rear frame 2 shown in FIGS. 9 to 13. Also, because the first bent components 21a, the second bent components 21b, the tacking support components 21c, and the anti-shifting components 21d are formed by sandwiching the sheet metal from the left and right sides by the cam molding, pressing can be performed not only from the outside, from the inside as well. Thus, the first bent components 21a, the second bent components 21b, the tacking support components 21c, and the anti-shifting components 21d can be formed very precisely. Also, since the first bent components 21a, the second bent components 21b, the tacking support components 21c, and the anti-shifting components 21d can be pressed simultaneously from the inside and the outside, the pressing entails fewer steps than when it is performed in stages. This affords better mass production.

In the illustrated embodiment, as discussed above, because the first bent components 21a and the second bent components 21b are formed by bending the edges 2a, 2b and 2d of the rear frame 2 inward on the front side, the first bent components 21a and the second bent components 21b are not exposed on the outside of the rear frame 2, unlike when the first bent components 21a and the second bent components 21b bulge out from the rear frame 2. Thus, the rear frame 2 can be favorably utilized as a rear housing that is exposed on the outside. Also, because the rear frame 2 includes the first bent components 21a and the second bent components 21b used as fixing components for fixing the plastic frame 6, the fixing member for fixing the plastic frame 6 that supports the liquid crystal cell 51 to the rear frame 2 can be eliminated, and the plastic frame 6 can be fixed directly to the rear frame 2. Thus, there is no need to provide a dedicated fixing member, and as a result, fewer parts are required. Therefore, with this TV 100, fewer parts are required, and the rear frame 2 can be favorably used as a rear housing. And since the rear frame 2 can also serve as the rear housing of the TV 100, the structure of the TV 100 can be simplified.

In the illustrated embodiment, as discussed above, the rear frame 2 forming the rear housing component 26 is provided, which means that the rear frame 2 can be utilized as part of the rear housing. Thus, there is no need to provide a rear housing to cover the rear face side of the rear frame 2. This allows the structure of the TV 100 to be easily simplified.

Also, in the illustrated embodiment, as discussed above, the first bent components 21a and the second bent components 21b are formed so as not to be exposed at the portion of the rear frame 2 that forms the rear housing component 26. Consequently, the first bent components 21a and the second bent components 21b serving as fixing components do not protrude as much on the rear face side of the rear frame 2. Thus, the rear frame 2 can be used as the rear housing even when the first bent components 21a and the second bent components 21b are used as fixing components for the plastic frame 6.

Also, in the illustrated embodiment, as discussed above, the first bent components 21a and the second bent components 21b are formed in an approximate L-shape that includes the side part 211 extending in the longitudinal direction and the front part 212 extending in a direction substantially perpendicular to the longitudinal direction. The plastic frame 6 is fixed to the front part 212 of the first bent components 21a and the second bent components 21b. Consequently, space on the rear face side of the front part 212 can be used to fix the plastic frame 6 to the front part 212. Thus, the plastic frame 6 can be easily fixed to the rear frame 2.

Also, in the illustrated embodiment, as discussed above, the plastic frame 6 is fixed to the first bent components 21a and the second bent components 21b by the screws 110, and the anti-deformation component 213, which maintains the spacing between the edges 2a, 2b, and 2d of the rear frame 2 and the front part 212 of the first bent components 21a and the second bent components 21b, is provided. Consequently, when the plastic frame 6 is fixed by the screws 110 to the first bent components 21a and the second bent components 21b, there will be less deformation of the first bent components 21a and the second bent components 21b caused by force exerted in the fastening direction (from the front face side to the rear face side).

Also, in the illustrated embodiment, as discussed above, the plastic frame-side positioning components 61 are formed on the plastic frame 6, and the rear frame-side positioning components 23, which are formed at positions corresponding to the plastic frame-side positioning components 61 of the plastic frame 6, are provided to the first bent components 21a and the second bent components 21b. Consequently, the plastic frame 6 can be fixed to the first bent components 21a and the second bent components 21b in a state of being positioned with respect to the rear frame 2 by the plastic frame-side positioning components 61 and the rear frame-side positioning components 23. Thus, the plastic frame 6 can be easily fixed in the correct position.

Also, in the illustrated embodiment, as discussed above, the plastic frame-side positioning components 61 of the plastic frame 6 are formed in the shape of a tapered boss. The rear frame-side positioning components 23 of the rear frame 2 is formed such that it includes the holes 231 into which the plastic frame-side positioning components 61 of the plastic frame 6 are inserted, and the guide components 232 formed in the direction in which the boss-shaped plastic frame-side positioning components 61 are inserted. Consequently, the boss-shaped plastic frame-side positioning components 61 can be guided by the guide components 232 while being inserted into the holes 231 of the rear frame-side positioning components 23. Thus, the boss-shaped plastic frame-side positioning components 61 can be easily inserted into the holes 231 of the rear frame-side positioning components 23.

Also, in the illustrated embodiment, as discussed above, the plastic frame-side tacking support components 62, which are formed near the plastic frame-side positioning components 61, are formed on the plastic frame 6. The rear frame 2 includes the tacking support components 21c formed at positions corresponding to the plastic frame-side tacking support components 62 of the plastic frame 6 and near the rear frame-side positioning components 23. Consequently, the state in which the plastic frame 6 is positioned with respect to the plastic frame-side tacking support components 62 can be maintained by the tacking support components 21c of the rear frame 2 and the plastic frame-side tacking support components 62 of the plastic frame 6. Thus, the plastic frame 6 can be more easily fixed in the correct position.

Also, in the illustrated embodiment, as discussed above, the plastic frame 6 includes the pair of plastic frame-side anti-shifting components 63 at both ends in the lengthwise direction. The rear frame 2 includes the anti-shifting components 21d formed at positions corresponding to the plastic frame-side anti-shifting components 63 of the plastic frame 6. Consequently, the plastic frame 6 tacked to the rear frame 2 can be easily kept from shifting away from the rear frame 2 by engaging the plastic frame-side anti-shifting components 63 at both ends of the plastic frame 6 with the anti-shifting components 21d of the rear frame 2.

Also, in the illustrated embodiment, as discussed above, the reflective sheet 3 is provided. The rear frame 2 has a concave shape that is recessed toward the rear face side. The rear frame 2 is configured to include the support components 22 that support the reflective sheet 3 at the inside portion of the first bent components 21a and the second bent components 21b near the edges of the rear frame 2. Consequently, the support components 22 and the first bent components 21a and second bent components 21b are disposed at positions that do not overlap each other when seen from the front face side. Thus, the first bent components 21a and the second bent components 21b will not get in the way when the reflective sheet 3 is disposed on the support components 22 from the front face side. This allows the reflective sheet 3 to be easily disposed on the support components 22.

The embodiment disclosed herein is just an example in all respects, and should not be considered limiting in nature. The scope of the present invention is indicated not by the above description of the embodiment, but by the appended claims, and encompasses all modifications within a meaning and scope equivalent to the appended claims.

For instance, in the illustrated embodiment, the present invention is applied to the TV 100 (television set) as a display device. However, the present invention is not limited to this. The present invention can also be applied to a PC (personal computer) monitor or another such display device.

Also, in the illustrated embodiment, the anti-deformation components 213 are provided to the first bent components 21a and the second bent components 21b serving as the inner bent component of the present invention. However, the present invention is not limited to this. The anti-deformation component can not be provided to the inner bent component.

Also, in the illustrated embodiment, the plastic frame 6 is fixed to the first bent components 21a and the second bent components 21b serving as the inner bent component of the present invention by the screws 110 serving as the fastening member of the present invention. However, the present invention is not limited to this. The plastic frame can be fixed to the inner bent component by hooks or an adhesive agent other than the screws or the fastening members.

Also, in the illustrated embodiment, the first bent components 21a and the second bent components 21b serving as the inner bent component of the present invention are provided to three of the four edges of the rear frame 2, namely, the upper edge 2a, the right edge 2b, and the left edge 2d. However, the present invention is not limited to this. The inner bent component can be provided to all four of the edges of the rear frame 2 (the upper edge 2a, the right edge 2b, the lower edge 2c, and the left edge 2d). Also, the inner bent component can be provided to any one, two, or three of the four edges of the rear frame.

Also, in the illustrated embodiment, the rear frame-side positioning component 23 is included as the second positioning component of the present invention for positioning the plastic frame 6, while the first bent components 21a are provided as the inner bent component of the present invention used as a fixing component for fixing the plastic frame 6. However, the present invention is not limited to this. As long as the inner bent component can be used as a fixing component, it can include one or more of a second positioning component, a second engagement component, and a second tacking component.

Also, in the illustrated embodiment, the plastic frame 6 is fixed to the first bent components 21a and the second bent components 21b serving as the inner bent component of the present invention. However, the present invention is not limited to this. In addition to the plastic frame 6, parts other than the plastic frame 6 can also be fixed along with the plastic frame 6 to the inner bent component.

Also, in the illustrated embodiment, the plastic frame 6 included four parts, namely, the upper plastic frame 6a, the right plastic frame 6b, the lower plastic frame 6c, and the left plastic frame 6d. However, the present invention is not limited to this. The plastic frame can be formed integrally in a rectangular shape.

Also, in the illustrated embodiment, the rear housing component 26 (e.g., the rear housing) is formed by exposing the outer edge part of the rear frame 2 on the X2 direction side. However, the present invention is not limited to this. The rear housing can be formed by exposing the entire rear frame 2 on the X2 direction side.

Also, in the illustrated embodiment, the rear frame 2 is formed from SECC. However, the present invention is not limited to this. The rear frame 2 can be formed from sheet metal such as SGCC (hot-dip galvanized steel sheet, or steel, galvanized, cold-rolled, coil), PCM steel sheet, or other such sheet metal. When the rear frame 2 is formed from PCM steel sheet, since the PCM steel sheet is precoated, there is no need to coat the rear frame 2. Thus, the manufacturing process is that much simpler.

In the illustrated embodiment, the display device includes a display component, a plastic frame, and a sheet metal rear frame. The plastic frame is disposed near the edge of the display component and supports the display component from the rear face side. The rear frame is disposed on the rear face side of the display component, and includes an inner bent component formed by bending the edge toward the inner front side. The inner bent component is used as a fixing component that fixes at least the plastic frame.

With the display device pertaining to this aspect, because the inner bent component is formed by bending the edge of the rear frame toward the inside on the front, as mentioned above, the inner bent component is not exposed on the outside of the rear frame, unlike when the inner bent component sticks out from the rear frame. Thus, the rear frame can be favorably used as a rear housing that is exposed on the outside. Also, because a rear frame is provided that includes an inner bent component used as a fixing component that fixes at least the plastic frame, the fixing member for fixing the plastic frame, which supports the display component, to the rear frame can be eliminated, and the plastic frame can be directly fixed to the rear frame. Thus, there is no need to provide a dedicated fixing member, and as a result fewer parts are required. Therefore, with this display device, fewer parts are required and the rear frame can be favorably used as a rear housing. Also, since the rear frame can be used (can double) as the rear housing of the display device, the structure of the display device can be simplified.

With the display device in the above aspect, the rear frame can form at least part of a rear housing. With this configuration, since the rear frame can be used as at least part of the rear housing, there is no need to provide a rear housing to cover the rear face side of the rear frame. This makes it easy to simplify the structure of the display device.

In this case, the inner bent component of the rear frame can be provided so as not to be exposed at the portion of the rear frame forming the rear housing, as seen from the rear face side. With this configuration, since the inner bent component serving as the fixing component does not protrude as much at the portion of the rear frame forming the rear housing, the rear frame can be used as the rear housing even when an inner bent component is used as a fixing component for the plastic frame.

In a configuration in which the inner bent component is provided so as not to be exposed at the portion of the rear frame forming the rear housing, the inner bent component of the rear frame can be substantially L-shaped, and can be bent such that it includes a side part extending in the longitudinal direction and a front part extending in a direction substantially perpendicular to the longitudinal direction. The plastic frame can also be fixed to the front part of the inner bent component. With this configuration, since space on the rear face side of the front part can be used to fix the plastic frame to the front part, the plastic frame can be easily fixed to the rear frame.

In a configuration in which the inner bent component is substantially L-shaped, the plastic frame can be fixed by a fastening member to the inner bent component. The inner bent component of the rear frame can also include an anti-deformation component that is formed to protrude from the front face side toward the rear face side and maintains the spacing between the front part of the inner bent component and the edge of the rear frame. With this configuration, when the plastic frame is fixed by a fastening member to the inner bent component, the force applied in the fastening direction (from the front face side to the rear face side) will not deform the inner bent component as much. This makes it less likely that the plastic frame will be fixed to the inner bent component (the rear frame) in an unstable state attributable to deformation of the inner bent component.

With the display device in the above-mentioned aspect, the plastic frame can include a first positioning component, and the inner bent component of the rear frame can include a second positioning component formed at a position corresponding to the first positioning component of the plastic frame. With this configuration, the plastic frame can be fixed to the inner bent component in a state of being positioned with respect to the rear frame because of the first positioning component of the plastic frame and the second positioning component of the rear frame (the inner bent component). Thus, the plastic frame can be easily fixed at the proper position.

In this case, the first positioning component of the plastic frame can be formed in a tapered boss shape extending toward the rear face side, and the second positioning component of the rear frame can include a hole into which the first positioning component of the plastic frame is inserted and a guide that is formed by burring in the direction in which the boss-shaped first positioning component is inserted into the hole. With this configuration, the guide formed in the hole allows the boss-shaped first positioning component to be guided while being inserted into the hole in the second positioning component. Thus, the boss-shaped first positioning component can be easily inserted into the hole of the second positioning component.

With a configuration in which the rear frame includes the first positioning component, the plastic frame can include a first tacking component formed near the first positioning component, and the rear frame can include a second tacking component formed near the second positioning component and at a position corresponding to the first tacking component of the plastic frame. With this configuration, the first tacking component of the plastic frame and the second tacking component of the rear frame allow the plastic frame to be kept in a state of being positioned with respect to the rear frame, which allows the plastic frame to be easily fixed at the proper position.

With a configuration including the first tacking component, the plastic frame can be formed to extend along one side of the display component, and can include a pair of anti-shifting first engagement components at the two ends in the lengthwise direction. The rear frame can also include anti-shifting second engagement components formed at positions corresponding to the first engagement components of the plastic frame. With this configuration, because the first engagement components at both ends of the plastic frame are engaged with the second engagement components of the rear frame, the plastic frame tacked to the rear frame can be easily prevented from coming loose from the rear frame.

The display device pertaining to the above-mentioned aspect can further include a reflective sheet that reflects light emitted from a light source, toward the front face side. The rear frame can be formed in a concave shape that is recessed toward the rear face side. Furthermore, the configuration can be such that a support component that supports the reflective sheet is included in the inner portion of the inner bent component near the edge of the rear frame. With this configuration, since the support component and the inner bent component are disposed at positions that do not overlap, as seen from the front face side, the inner bent component will be less apt to get in the way when the reflective sheet is disposed on the support component from the front face side. This allows the reflective sheet to be easily disposed on the support component.

With the display device, as discussed above, fewer parts are required, and the rear frame can be favorably used as a rear housing.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A display device comprising:
   a display component;
   a light source that emits light;
   a reflective sheet that reflects the light towards a front of the display device;
   an optical member through which the light passes;
   a frame supporting an edge portion of the display component from a rear side of the display component; and
   a rear frame disposed on the rear side of the display component,
   the rear frame including a bottom portion over which the light source is disposed, an outer end portion that is parallel to a display face of the display component and forms at least a part of a rear housing of the display device that is exposed at a rear of the display device, and an inner bent component that at least fixedly couples the frame to the rear frame,
   the inner bent component extending towards the front of the display device from an edge part of the outer end portion, and extending inward towards a center of the display device relative to the edge part of the outer end portion, and
   a distance between the display face of the display component and the outer end portion being smaller than a distance between the display face of the display component and the bottom portion.

2. The display device according to claim 1, wherein
   the inner bent component is disposed inside of the display device, with the inner bent component being not exposed at the rear of the display device.

3. The display device according to claim 1, wherein
   the inner bent component includes a side part that extends towards the front of the display device from the edge part of the outer end portion, and a front part that extends substantially perpendicularly to the side part from the side part, and
   the frame is fixedly coupled to the front part of the inner bent component.

4. The display device according to claim 1, wherein the frame is fixedly coupled to the inner bent component by a fastening member.

5. A display device comprising:
a display component;
a frame supporting an edge portion of the display component from a rear side of the display component; and
a rear frame disposed on the rear side of the display component,
the rear frame including a bottom portion over which the light source is disposed, an outer end portion that is parallel to a display face of the display component and forms at least a part of a rear housing of the display device that is exposed at a rear of the display device, and an inner bent component that at least fixedly couples the frame to the rear frame, the inner bent component including a side part that extends towards a front of the display device from an edge part of the outer end portion, and a front part that extends inward towards a center of the display device relative to the edge part of the outer end portion and substantially perpendicularly to the side part from the side part,
a distance between the display face of the display component and the outer end portion being smaller than a distance between the display face of the display component and the bottom portion,
the frame being fixedly coupled to the front part of the inner bent component, and
the inner bent component further including an anti-deformation component that protrudes towards the rear of the display device from the front part of the inner bent component, with the anti-deformation component maintaining a spacing between the front part of the inner bent component and the edge part of the outer end portion.

6. The display device according to claim 1, wherein
the frame includes a first positioning component, and
the inner bent component includes a second positioning component at a position corresponding to the first positioning component of the frame.

7. The display device according to claim 6, wherein
the first positioning component of the frame includes a tapered boss part that extends towards the rear of the display device, and
the second positioning component of the rear frame includes a burring part with a hole in which the tapered boss part of the first positioning component is disposed, the burring part axially extending towards the rear of the display device.

8. The display device according to claim 6, wherein
the frame includes a first tacking component disposed adjacent to the first positioning component, and
the rear frame includes a second tacking component disposed adjacent to the second positioning component at a position corresponding to the first tacking component of the frame.

9. The display device according to claim 8, wherein
the frame includes a pair of first engagement components at both ends of a side portion of the frame, respectively, and
the rear frame includes a pair of second engagement components at positions corresponding to the first engagement components of the frame, the first engagement components and the second engagement components being engaged with respect to each other, respectively.

10. The display device according to claim 1, wherein
the rear frame has a concave center part that is recessed towards the rear of the display device, and
the outer end portion of the rear frame has a sheet support part that supports the reflective sheet, the sheet support part being disposed closer to the center of the display device relative to the inner bent component.

11. A display device comprising:
a display component;
a light source that emits light towards a front of the display device;
a frame supporting an edge portion of the display component from a rear side of the display component; and
a rear frame disposed on the rear side of the display component,
the rear frame including a bottom portion over which the light source is disposed, an outer end portion that is parallel to a display face of the display component and forms at least a part of a rear housing of the display device that is exposed at a rear of the display device, a light housing portion that is disposed inward of the display device relative to the outer end portion and bulges away from the display component relative to the outer end portion to house the light source, and an inner bent component that at least fixedly couples the frame to the rear frame,
the inner bent component extending towards the front of the display device from an edge part of the outer end portion, and extending inward towards a center of the display device relative to the edge part of the outer end portion,
a distance between the display face of the display component and the outer end portion being smaller than a distance between the display face of the display component and the bottom portion.

12. The display device according to claim 1, wherein
the outer end portion and the inner bent component overlap with respect to each other as viewed in a direction directing from the rear of the display device to the front of the display device.

13. The display device according to claim 5, wherein
the outer end portion and the anti-deformation component overlap with respect to each other as viewed in a direction directing from the rear of the display device to the front of the display device.

14. The display device according to claim 11, wherein
the inner bent component includes an anti-deformation component that maintains a spacing between the inner bent component and the edge part of the rear frame, and
the outer end portion and the anti-deformation component overlap with respect to each other as viewed in a direction directing from the rear of the display device to the front of the display device.

15. The display device according to claim 1, wherein
a distance between the display face of the display component and the inner bent component is smaller than a distance between the display face of the display component and the outer end portion.

16. The display device according to claim 5, wherein
a distance between the display face of the display component and the inner bent component is smaller than a distance between the display face of the display component and the outer end portion.

17. The display device according to claim 11, wherein
a distance between the display face of the display component and the inner bent component is smaller than a distance between the display face of the display component and the outer end portion.

18. The display device according to claim 1, wherein the outer end portion faces a part of the inner bent component and supports the reflective sheet by directly sandwiching the reflective sheet between the outer end portion and the optical member.

* * * * *